Jan. 13, 1970 K. E. GANSKE ET AL 3,489,369

TAPE TRANSPORT SYSTEM

Filed Feb. 14, 1968 2 Sheets-Sheet 1

INVENTORS
KINGSTON E. GANSKE,
JERRY O. KELLEY &
DON C. BARNETT

BY Marechal, Biebel, French & Bugg
ATTORNEYS

United States Patent Office 3,489,369

Patented Jan. 13, 1970

3,489,369

TAPE TRANSPORT SYSTEM

Kingston E. Ganske, Jerry O. Kelley, and Don C. Barnett, Columbus, Ind., assignors to Arvin Industries, Inc., Columbus, Ind., a corporation of Indiana Filed Feb. 14, 1968, Ser. No. 705,478

Int. Cl. G11b *15/32*

U.S. Cl. 242—187 6 Claims

ABSTRACT OF THE DISCLOSURE

A reversible rotatable capstan drives flexible tape from a supply roll to a take-up roll and back again. The rolls are mounted for movement toward and away from the capstan as they increase or decrease in size. An arm-mounted roller engages each roll and through a spring urges the associated roll away from the capstan. Movement from spring action is limited by an arm and cam following the motion of the roll, such that the outermost convolution on the roll is urged toward a fixed spacing from the capstan. Torque motors are connected to oppose the action of the spring biased rollers with respect to each roll. The torque motors are alternatively actuated such that the spacing effect of the roller on that roll functioning as a takeup is overcome and the take-up roll is pressed into contact with the peripheral face of the capstan while the supply roll is held spaced from the capstan.

BACKGROUND OF THE INVENTION

This invention relates to an improved tape transport system such as may be used, for example, in a magnetic recording and playback apparatus. Capstan drives for tape transport systems are usually employed where close control of tape speed is needed. Capstans with a resilient surface have been used, with the tape pressed into contact with this surface, either at spaced positions where the tape first engages and finally leaves the capstan, or with the tape contacting a substantial segment of the capstan face and pressed into contact therewith both at its initial point of contact and its point of departure from the capstan surface. It has also been suggested that in the latter case the pressure exerted against the tape be less at the point where it first engages the capstan than at departure.

These systems have been found to introduce further irregularities which tend to interfere with the desired constant speed drive. For example, the resilient capstan surface, being compliant, may tend to bulge in regions adjacent where the compressive force is exerted, thus the actual guiding surface of the capstan which receives, frictionally engages, and drives the tape may actually be out of round at or near the point of initial contact, and introduces changes in velocity. The supply may actually be caused to rotate with a peripheral speed greater than the speed of the capstan surface. Any such changes in velocity or changes in tape tension will introduce time base errors, and in certain types of magnetic recording/playback equipment these errors are not tolerable.

Furthermore, maintaining pressure contact with the resilient surface when the transport system is not operating may result in slight denting of the resilient surface. Such dents may or may not be permanent, but are quite often more than temporary in nature and again result in an out of round condition in the capstan which is not tolerable if precise tape velocity control is needed.

SUMMARY OF THE INVENTION

In accordance with the present invention a rotatable capstan having a resilient surface engages the tape over a substantial section of its resilient peripheral face. The capstan functions to pull the tape from a supply roll to a take-up roll at a predetermined constant speed. The supply roll is maintained in predetermined spaced relation to the peripheral surface of the capstan. This permits the creation of a film of air between the tape and capstan which provides head to tape contact and prevents capstan high spots from exerting high tape contact force against the head. The tape is smoothly guided into contact with the capstan surface, and then there is no relative motion between the tape and the capstan once engagement occurs. However, by maintaining the aforementioned spacing, a span of tape extends between the supply and the capstan, effectively isolating from the region of the capstan any velocity changes encountered at or near the point where the tape departs from the supply. Normally a slight braking action on the supply roll hub is used to maintain some resistance to transfer of the tape from the supply roll to the capstan.

On the other hand, the take-up roll may be urged into presure contact with the resilient capstan surface, thus the tape can be driven into the take-up roll and wound tightly thereon. Normally, the driving force from the capstan is sufficient to rotate the take-up roll and wind the tape tightly thereon without need of a further take-up drive.

Since the system may be constructed to be reversible, arrangements can be made such that the rolls function interchangeably as either supply or take-up rolls. Therefore, the mechanism for holding the supply roll in constant spaced relation to the capstan surface may be duplicated as to each roll. The function of this mechanism may be overcome by a suitable torque motor arrangement which operates on whichever roll is functioning as a take-up, thereby urging it into contact with the capstan surface. The mechanism holding the supply roll spaced from the capstan includes a following arm which, through a cam and follower arrangement, holds a spring loaded roller against the outermost convolution of tape on the supply roll. The following arm moves according to the change in position of the supply roll axle as the supply roll decreases in size, and through the cam translates its motion into a position control for the spring loaded roller, which in turn maintains the desired constant position of the supply roll periphery.

DESCRIPTION OF THE PREFERRED EMBODIMENT

Figures 1, 2:
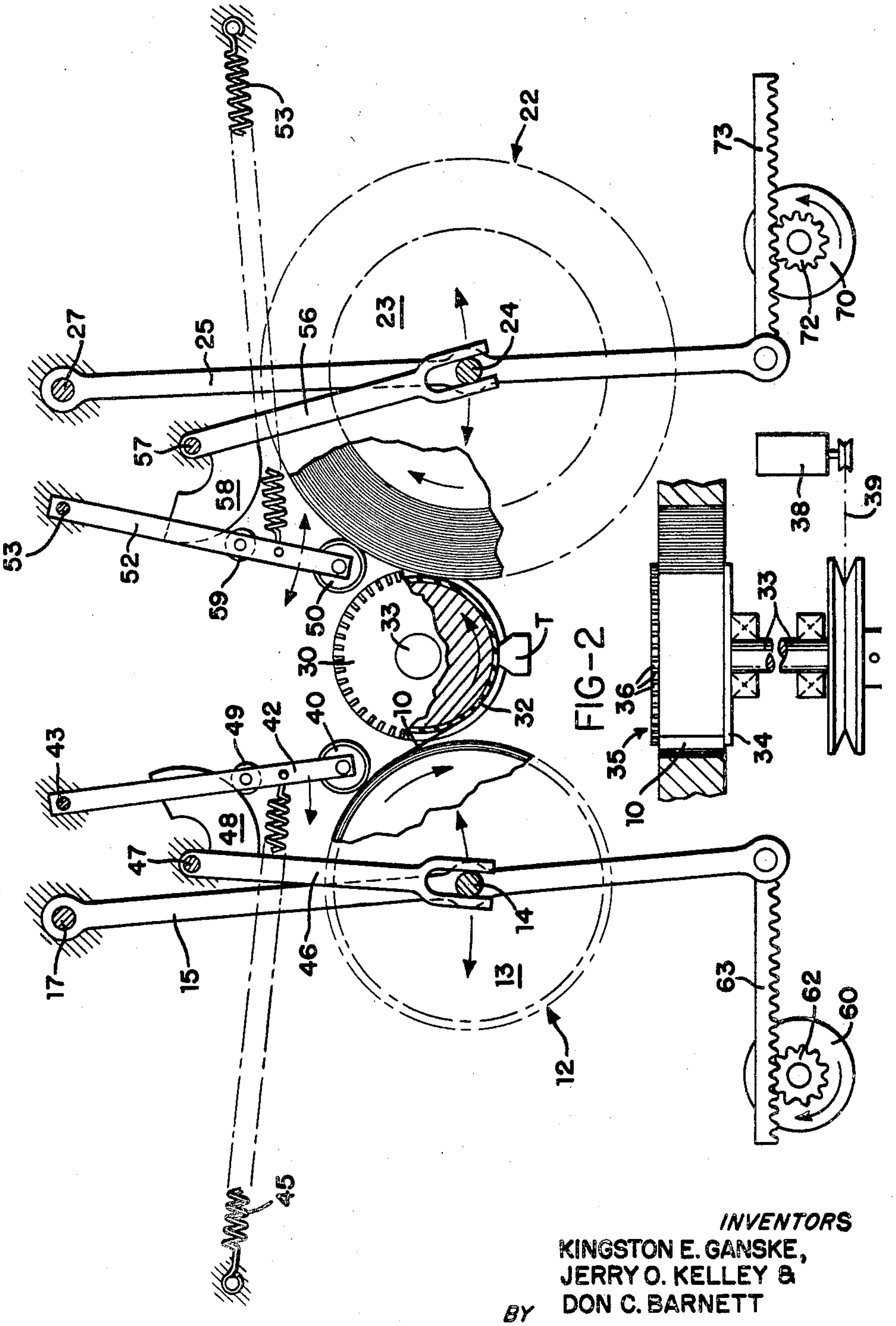
FIG. 1 is a schematic drawing of the arms and controls for a tape transport system embodying the present invention.
FIG. 2 is a fragmentary view showing a portion of the capstan and the adjacent supply and take-up rolls.

Referring to the drawing, which discloses a preferred embodiment of the invention, the tape 10, which may for example be magnetic recording tape, is shown coming from a supply roll 12 which is wound on a hub 13 supported on a rotatable axle 14. This axle is in turn carried on a swinging arm 15 that is pivotally mounted at 17 to the deck or base of the transport. The tape 10 passes from the supply roll to a take-up roll 22 where it is supported and wound on a hub 23 having an axle 24 rotatably mounted on the supporting arm 25. This arm is also pivotally mounted to the base or deck through the pivot hinge or pin 27.

Suitable one-way acting brakes (not shown) may be provided for the axles 14 and 24, to resist unwinding of the tape from the associated hub with a limited force. When the hub is rotated in the opposite direction the brake has no effect.

The tape is passed around the driving capstan 30 which has a resilient peripheral face 32, such as a rubber "tire," which engages the back surface of the tape and moves it from one roll to the other. The capstan is mounted on a drive shaft 33 which supports and rotates the capstan. The capstan incorporates a lower fixed or rigid guide flange 34 and an upper flange 35 which preferably is formed of somewhat flexible material and is sectioned adjacent its outer edge, as by a number of slots, into a plurality of spring sections 36 which tend to guide the upper edges of the tape downwardly, thus guiding the lower edge of the tape into contact with the flange 34. This arrangement assures proper alignment of the tape, as when passing it across one or more magnetic transducers T that are mounted to contact the tape at one side of the capstan, and also contributes to accurate placement of the tape on the take-up in the type of configuration shown.

The capstan is driven by a suitable synchronous motor 38 through a drive connection such as the belt and pulley motor 39 which is shown schematically in FIG. 2. In the two-way configuration shown, this motor is reversible.

In accordance with the invention a means is provided for holding the departure point of the supply roll 12 at a predetermined and constant spaced relation to the capstan, thereby causing the tape 10 to span a gap from its point of departure from the supply roll to its point of initial engagement with the peripheral face of the capstan. This spacing need not be very large, and in practice a spacing of about 0.010 inch has been found adequate. For this purpose a roller 40 is mounted for free rotation on the end of an arm 42 that is in turn pivotally mounted at 43 to the deck. A medium force spring 45 is connected between a fixed point on the deck and the arm 42, and tends to pull the roller 40 into engagement with the supply roll, and thus push the roll away from the capstan, in the direction shown by the arrow in FIG. 1.

The movement of arm 42 and roller 40 is controlled through a following arm 46 which is pivoted to the base at 47, and which has a forked end engaged around the axle 14, or some other suitable point on the supply roll. The arm 46 carries a control cam 48 which engages a roller follower 49 on the arm 42. The cam is contoured according to the decrease in diameter of the roll 12 as successive convolutions of the tape are removed. The arm 46 and cam 48 thus function as a following and position control means which maintains the roller 40 engaging the outermost convolution of the tape on the supply roll, and holds this roll at an essentially constant spacing from the peripheral resilient face of the capstan.

Since the transport system preferably is intended to be bi-directional, the invention preferably includes a comparable control for the roll 22, since in the reverse direction of operation from that shown, it will in fact function as the supply roll. Thus, there is a second roller 50 carried on the end of an arm 52 which is pivotally mounted to the base at 53. The roller 50 rides in contact with the outermost convolution of tape on the roll 22, and is urged against the roll by the force of spring 55 connected between arm 52 and a fixed point on the base. A following arm 56 is pivoted to the base at 57 and carries a further control cam 58 which engages a roller follower 59 on arm 52.

This system tends of course to move the take-up roll 22 away from the capstan, however in the type of system shown it is desired that there be pressure contact between the capstan and this roll in order to assure that the tape is placed smoothly and evenly on the take-up. Further, this contact may be used to rotate the take-up. Therefore, means are provided to override the force and effect of the rollers 40 and 50, respectively, depending upon which side is functioning as the take-up.

A torque motor 60 having an output pinion or gear 62 is connected to drive a rack 63, which is in turn connected to an extension of the supply roll mounting arm 15. Similarly, a torque motor 70 has a pinion 72 meshing with a control rack 73 that is pivotally connected to an extension of mounting arm 25. Depending upon the desired direction of rotation, one or the other of these torque motors is actuated to exert sufficient force to overcome the force of the corresponding spring, roller and connected mechanism, and to urge the roll into pressure contact with the capstan. In the condition shown torque motor 70 is thus energized and produces pressure contact between the take-up roll 22 and the capstan. Torque motor 60 at this time exerts no effective force on the system. However, in reverse direction operation, torque motor 60 overrides the roller 40 and its associated mechanism, while torque motor 70 becomes ineffective and the roller 50 maintains the desired constant spacing between the tape departure point of roll 22 and the capstan surface.

Figure 3:
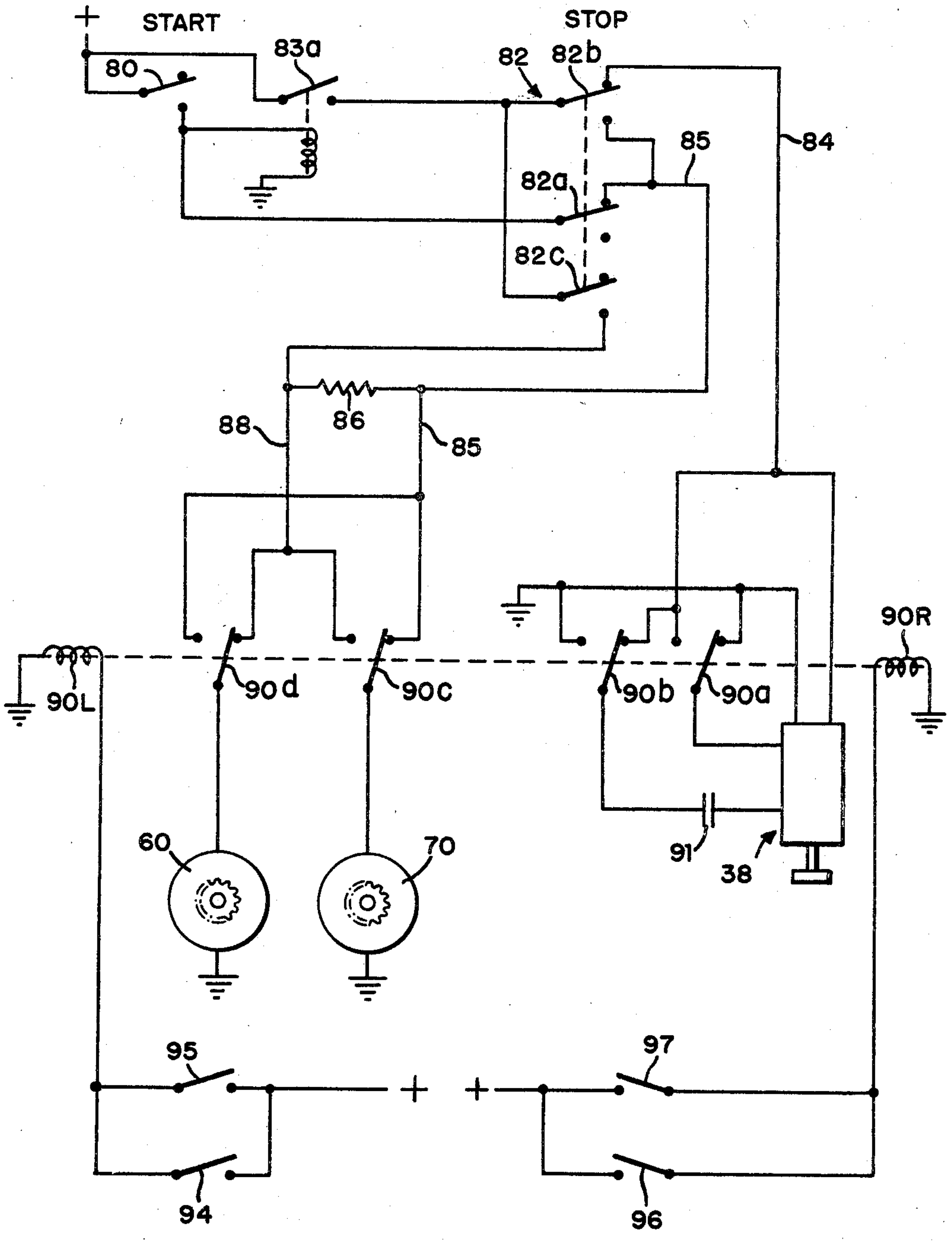
FIG. 3 is a simplified schematic control diagram for the system shown in FIG. 1.

FIG. 3 is a diagram of a suitable control for the system, shown for simplicity as an A.C. control circuit. Power supply is indicated by the + legend, and the opposite terminals are shown grounded. A manually operated start switch 80 (shown open) is connected to one element **82*a* of a three pole double throw manual stop switch 82 (shown in normal or start position). The start switch also provides power when closed to the coil of a time delay relay 83. The blade 83*a* of this relay completes a power supply circuit directly to a second blade element 82*b* of the stop switch, and this in turn applies power to the motor power line 84**.

The third element **82*c* of the stop switch is connected to power supply through the relay blade or contact 83*a*, and thus is controlled by it. In the normal position of the stop switch, the element 82*a* provides power (with the start switch closed) to a line 85 which forms a higher voltage supply to one or the other of the torque motors 60 and 70. Also, line 85 is arranged to receive power through the normally open contact of stop switch element 82*b* in the closed position of the stop switch, provided relay 83** is energized.

A dropping resistor 86 is connected from line 85 to a lower voltage supply line 88. This line can also become a higher voltage supply via its connection through the normally open contact of stop switch element **82*c*, also provided relay 83** is energized.

A direction control latching relay 90 has four double pole contacts which control the reversing circuits for motor 38, and for the torque motors. Relay blades **90*a* and 90*b* are arranged to reverse the polarity of one of the motor windings, through capacitor 91. Relay blades 90*c* and 90*d* control the power supply to torque motors 70 and 60, respectively, from either the high voltage line 85 or the normally low voltage line 88. In the condition shown, motor 70 is connected to the higher voltage and thus holds take-up roll 22 against the capstan, and motor 38 is rotating the capstan 30** counterclockwise, as viewed in FIG. 1.

To reverse, the coil 90L of the latching relay is energized, either through the manual reversing switch 94, or the automatically controlled switch 95 (see also FIG. 1) which senses movement of arm 25 corresponding to a full take-up roll 22. Changing direction back to that shown is accomplished by energized coil 90R of the latching relay, either through manual switch 96 or the automatic switch 97 which is closed by arm 15 when it reaches a position corresponding to a full roll 12.

On stopping the system, moving stop switch 82 to its stop position, opposite to that shown, switch element **82*b* maintains power to the higher voltage line 85 through its normally open contact, and line 88 is changed to the higher voltage through the normally open contact of element 82*c*. Both torque motors thus receive higher voltage and hold both roll 12 and 22** against the capstan. This prevents overrunning of the supply roll as the system decelerates.

The start and stop switches are mechanically interlocked by conventional means (not shown), such that actuating one moves the other to the opposite position. Thus start switch 80 will open when stop switch 82 is closed. This interrupts the power supply to the coil of the time delay relay. However a time delay device (not shown) holds the relay blade 83*a* closed for a certain period of time, sufficient to permit the system to stop before blade 83*a* opens and interrupts the power supply to motor 38 and torque motors 60 and 70. When this happens both rollers 40 and 50 are free to move their associated rolls 12 and 22 away from the capstan, relieving its surface 32 from pressure contact with either roll.

While the advantages provided by this invention are particularly useful in connection with a bi-directional tape transport system of the type illustrated, it should be understood that features of the invention are also applicable to somewhat different forms of transport systems. In the bi-directional system it is desirable to have the rolls as close as possible to the capstan for quickly changing the direction of operation with a minimum of difficulty and a minimum of extraneous mechanism. Thus, it is convenient to have the supply roll paying off tape close to the capstan, however according to the invention there must be some spacing between the point where the tape departs the supply roll and the point where it engages the capstan surface. Where a rapid reversal of operating direction is not important, the supply roll can be spaced farther away, and the tape can for example be guided to the capstan by additional rollers or the like. In any event there should be some significant spacing between any adjacent guide roller and a capstan so that a section of the tape moves free from contact with other parts into contact with the capstan surface.

Similarly, the take-up illustrated is preferred for rapid reversal in a bi-directional system. However the features of the invention are applicable to a transport system where the take-up is an ordinary reel, preferably driven through a conventional slip clutch mechanism, and mounted some distance from the capstan, with the tape being suitably guided to the take-up.

While the form of apparatus herein described constitutes a preferred embodiment of the invention, it is to be understood that the invention is not limited to this precise form of apparatus, and that changes may be made therein without departing from the scope of the invention.

What is claimed is:

1. In a tape transport system including a pair of rolls providing respectively a supply and take-up for flexible tape, a rotatable capstan arranged to engage the tape over a section of its peripheral face and to drive the tape from one of said rolls to the other, a rotary drive connected to said capstan, and means mounting said rolls for movement toward and away from said capstan in compliance with the build-up of tape thereon and consequent change in diameter of the rolls;

the improvement comprising means operative to hold the one of said rolls functioning as a supply in predetermined spaced relation to said capstan causing the tape to span a gap from its point of departure from said one roll to its point of initial engagement with its peripheral face and said capstan;

and means urging the other said roll functioning as a take-up into pressure contact with said peripheral face of said capstan for direct traverse of the tape from said capstan onto said other roll.

2. A tape transport system as defined in claim 1, wherein said means for holding said one roll spaced from said capstan includes a roller mounted to engage the outermost convolution of tape on said one roll, means supporting said roller, means connected to follow the movement of said one roll in compliance with its change in diameter, means biasing said roller supporting means in a direction urging said roller to move said one roll away from said capstan, and position control means connected to said following means and operative on said roller supporting means in opposition to said biasing means such as to maintain said roller in contact with the outermost convolution of tape at a position maintaining said one roll at an essentially constant spacing from said peripheral face of said capstan.

3. A tape transport system as defined in claim 2, including selectively operable means constructed and arranged to move said one roll toward said capstan and into pressure contact with the pheripheral face of said capstan in opposition to the force exerted by said roller for maintaining the spacing between said one roll and said capstan.

4. A tape transport system as defined in claim 3, wherein said rotary drive is reversible and said other roll is provided with duplicate means for holding said other roll spaced from said capstan together with associated duplicate following means, a second roller and supporting means mounting said second roller, means biasing said second roller into contact with the outermost convolution of tape on said other roll, and second selectively operable means for urging said other roll into pressure contact with said capstan in opposition to the action of said second roller.

5. A tape transport system as defined in claim 4, wherein said selectively operable means are actuated alternatively in accordance with the direction of rotation of said capstan whereby that roll functioning as a take-up is in contact with said peripheral face of said capstan and that roll functioning as a supply has its outermost convolution held at a fixed spacing from said capstan as the tape is withdrawn therefrom.

6. A tape transport system as defined in claim 1 wherein said capstan includes a rigid peripheral flange extending radially outward from one edge of said peripheral face and operative to overlap the outermost portion of said other roll, and a flexible flange on the opposite edge of said peripheral face having a plurality of individual biasing sections extending radially outward of said capstan beyond said peripheral face and adapted to overlie a part of the outermost portion of said other roll.

References Cited

UNITED STATES PATENTS

| | | | |
|---|---|---|---|
| 3,093,284 | 6/1963 | Mullin | 226—176 |
| 3,309,037 | 3/1967 | Amos | 242—67.3 |
| 3,370,803 | 2/1968 | Newell | 242—55.12 |
| 3,370,804 | 2/1968 | Peyton | 242—55.14 X |

GEORGE F. MAUTZ, Primary Examiner

U.S. Cl. X.R.

242—192